(12) United States Patent
Nakamura et al.

(10) Patent No.: US 6,447,965 B1
(45) Date of Patent: Sep. 10, 2002

(54) ELECTROPHOTOGRAPHIC PHOTORECEPTOR CONTAINING TIOPC, METHOD FOR MANUFACTURING THE SAME, AND COATING LIQUID FOR CHARGE GENERATING LAYER

(75) Inventors: Tomomi Nakamura, Osaka; Masato Miyauchi, Kyoto, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/653,252

(22) Filed: Aug. 31, 2000

(30) Foreign Application Priority Data

Sep. 1, 1999 (JP) .......................................... 11-247753

(51) Int. Cl.$^7$ .............................................. G03G 5/047
(52) U.S. Cl. ....................... 430/59.5; 430/133; 430/134
(58) Field of Search ............................... 430/59.5, 57.3, 430/133, 134

(56) References Cited

U.S. PATENT DOCUMENTS

| | | | |
|---|---|---|---|
| 4,898,799 A | 2/1990 | Fujimaki et al. | |
| 5,194,354 A | 3/1993 | Takai et al. | |
| 5,593,805 A | * 1/1997 | Go et al. | 430/59.5 |
| 5,736,282 A | 4/1998 | Tamura et al. | |
| 5,874,570 A | 2/1999 | Tamura et al. | |
| 5,876,889 A | 3/1999 | Nakamura et al. | |
| 5,972,551 A | 10/1999 | Miyauchi et al. | |
| 6,090,511 A | * 7/2000 | Yang et al. | 430/57.3 |
| 6,156,466 A | * 12/2000 | Tamura et al. | 430/57.3 |
| 6,210,847 B1 | * 4/2001 | Miyauchi et al. | 430/59.5 |

FOREIGN PATENT DOCUMENTS

| | | |
|---|---|---|
| EP | 0 658 814 A2 | 6/1995 |
| EP | 0 686 878 A1 | 12/1995 |
| EP | 1 018 670 A1 | 7/2000 |
| FR | 2 757 864 A1 | 7/1998 |
| JP | 61-239248 A | 10/1986 |
| JP | 62-67094 A | 3/1987 |
| JP | 64-17066 A | 1/1989 |
| JP | 3-54264 A | 3/1991 |
| JP | 8-194322 A | 7/1996 |
| JP | 10-237347 A | 9/1998 |
| JP | 2000-129155 A | 5/2000 |

OTHER PUBLICATIONS

Borsenberger, Paul M. Organic Photoreceptors for Imaging Systems. New York: Marcel–Dekker, Inc. p. 289. (1993).*
Miyazaki, "Photoreceptors for Digital Electrophography", The Society Journal, Society of Electrophotography of Japan, vol. 32, No. 3, 1993, pp. 282–289.
Moser et al., Phthalocyanine Compounds, "Chapter 3 Preparation", ® Reinhold Publishing Corporation, 1963, pp. 104–141.

* cited by examiner

Primary Examiner—Christopher Rodee
(74) Attorney, Agent, or Firm—Nixon & Vanderhye P.C.

(57) ABSTRACT

An electrophotographic photoreceptor highly sensitive to laser light, which is capable of forming an image without forming an interference fringe and a coating liquid for a charge generating layer for forming the same are provided, and the photoreceptor is produced with excellent coating properties and high electric characteristics at a low cost. The electrophotographic photoreceptor comprises an electroconductive support and a photosensitive layer thereon having a charge generating layer containing TiOPc as a charge generating material and having a Y value by a color measuring apparatus of 37 or less, and particularly 35 or less, and a charge transporting layer, accumulated thereon, containing a charge transporting material. In an X-ray diffraction spectrum, the TiOPc has major diffraction peaks at Bragg angles (2θ±0.2°) of 7.3°, 9.4°, 9.6°, 11.6°, 13.3°, 17.9°, 24.1° and 27.2°, and in particular, the diffraction peaks at the Bragg angles (2θ±0.2°) of 9.4° and 9.6° overlap each other and form a bundle of peaks, which is a maximum intensity of diffraction, and the peak at the Bragg angle (2θ±0.2°of 27.2° is a second maximum intensity of diffraction. The charge generating layer is produced by using a coating liquid containing TiOPc and having a turbidity of 180 or more, particularly 200 to 350.

3 Claims, 2 Drawing Sheets

ELECTROPHOTOGRAPHIC PHOTORECEPTOR CONTAINING TIOPC, METHOD FOR MANUFACTURING THE SAME, AND COATING LIQUID FOR CHARGE GENERATING LAYER

BACKGROUND OF THE INVENTION

1. Field of the Invention

The present invention relates to an electrophotographic photoreceptor using oxotitanyl phthalocyanine (TiOPc) as a charge generating material, and also relates to a coating liquid for a charge generating layer for producing the same and a method for manufacturing the same.

2. Description of the Related Art

In image forming apparatuses such as a printer, a laser light source, in particular a small-sized semiconductor laser light source of high reliability, is used instead of a white light source, to realize image formation of high speed, high image quality and non impact.

Electrophotographic photoreceptors installed in image forming apparatuses are classified into inorganic photoreceptors and organic photoreceptors. Typical inorganic materials used as the inorganic photoreceptor include selenium (Se) containing materials such as amorphous selenium (a-Se) and, amorphous arsenic selenium (a-AsSe), zinc oxide (ZnO), cadmium sulfide (CdS) and amorphous silicon (a-Si), which have been subjected to dye sensitization and dispersed in a binder resin, but they are substantially not applied to practical use due to various problems. Specifically, a photoreceptor using Se containing material or CdS is inferior in heat resistance and storage stability, and involves a problem in disposal. A photoreceptor using ZnO is low sensitive and poorly durable. A photoreceptor using a-Si is low in causing environmental pollution and is highly sensitive and highly durable, but it brings about image defects caused by a production process, i.e., a plasma CVD (chemical vapor deposition) method, and has low productivity, which causes an increase in production cost.

On the other hand, since the organic materials used for the organic photoreceptor include many kinds of materials, a photoreceptor having high storage stability and low toxicity can be obtained by selecting an appropriate one from among the materials, and formation of a thin film can be easily conducted by coating at a low production cost. Thus, improvements in sensitivity and durability have been rapidly realized in recent years. Such materials include bisazo type compounds, squaric acid methine type dyes, indoline type dyes, cyanine type dyes, pyrylium type dyes and phthalocyanine type compounds.

It is firstly desirable in a photoreceptor installed in an image forming apparatus using a laser light source to exhibit high sensitivity to light of a long wavelength band of about 800 nm, which is the wavelength band of the laser light source. A photoreceptor using a bisazo type compound has low sensitivity to light of a long wavelength band. A photoreceptor using a squaric acid methine type dye, indoline type dye, cyanine type dye or pyrylium type dye has relatively high sensitivity to light of a long wavelength band, but is inferior in stability of reiteration characteristics. Therefore, these organic materials cannot be subjected to practical use. A photoreceptor using a phthalocyanine type compound has high sensitivity to light of a long wavelength band and higher stability than the other materials. In particular, a photoreceptor using TiOPc has high sensitivity.

The phthalocyanine type compounds have different sensitivity peaks and physical properties depending on whether a central metallic atom is present or not and on the species thereof, and the physical properties vary depending on the crystal forms thereof. Accordingly, it is necessary to include the crystal form in criteria for judging whether the compounds can be used for a photoreceptor. The crystal forms of TiOPc are classified by difference in diffraction angle of an X-ray diffraction spectrum in Denshi Shashin Gakkai-shi (The Society Journal, Society of Electrophotography of Japan), (Vol.32, No. 3, 1993): 282–289) Japanese Unexamined Patent Publication JP-A 61-239248 (1986) discloses a type, Japanese Unexamined Patent Publication JP-A 62-67094 (1987) discloses A type, Japanese Unexamined Patent Publication JP-A 64-17066 (1989) discloses Y type, Japanese Unexamined Patent Publication JP-A 3-54264 (1991) discloses M-α type, and furthermore C type, M type and I type are present. The crystal types of TiOFc, the lattice constants of which have been known, are C type, Phase I type and Phase II type. Phase II type is of the triclinic system, and Phase I type and C type are of the monoclinic system. Prom the crystal lattice constants, A type and I type belong to Phase I type, α type and β type belong to II type, and M type belongs to C type. Furthermore, Japanese Unexamined Patent Publication JP-A 10-237347 (1998) discloses a photoreceptor using crystalline TiOPc exhibiting a specific X-ray diffraction spectrum.

Secondly, the photoreceptor is desired to form an image without generation of interference fringes. Because laser light has a single wavelength, incident light on a photosensitive layer and reflected light on a support interfere at an interface of the photosensitive layer with the support to form an interference fringe. As precautionary measures against generation of interference fringes, the following measures are disclosed in Denshi Shashin Gakkai-shi (The Society Journal, Society of Electrophotography of Japan), (Vol.32, No. 3, 1993): 282–289), i.e., (1) a surface of the support is roughened by cutting, spiral cutting, blast processing or anodic oxidation, (2) the surface of the support is appropriately roughened by coating an electroconductive layer using slectroconductive particles, (3) particles scattering light are incorporated into an adhesive layer between the support and the photosensitive layer, and (4) a photoreceptor is made transparent. The measures (1) to (3) are related to irregularly reflecting light, and the measure (4) is related to transmitting incident light. As a specific example of the measure (4), Japanese Unexamined Patent Publication JP-A 8-194322 (1996) discloses a technique in that an organic photoelectroconductive transparent sheet formed by accumulating an organic photoelectroconductive layer on a transparent electroconductive base sheet is wound on a support having a surface made black.

In the measure (1), however, the support must be separately processed. In the measure (2), another layer must be provided. In the measure (3), particles must be newly introduced. There is a possibility that these bring about deterioration in coating properties of a coating liquid and deterioration in electric characteristics. In the measure (4), the material for the electroconductive support itself must be changed, resulting in an increase in production costs.

SUMMARY

An object of the invention is to provide an electrophotographic photoreceptor which exhibits high sensitivity to laser light and can form an image without forming an interference fringe, to provide a coating liquid for a charge generating layer for forming the photoreceptor, and to provide a method for manufacturing an electrophotographic photoreceptor, by which the photoreceptor can be produced with excellent coating properties and high electric characteristics at a low cost.

The invention relates to an electrophotographic photoreceptor comprising:

an electroconductive support; and a photosensitive layer on the electroconductive support, including at least a charge generating layer and a charge transporting layer accumulated thereon, the charge generating layer containing oxotitanyl phthalocyanine as a charge generating material, the charge generating layer having a Y value of 37 or less, which Y value is one element of three excitation values in XYZ color system showing an object color.

According to the invention, the photoreceptor exhibits high sensitivity to laser light since TiOPc is contained, and an image can be formed without generation of an interference fringe due to laser light since the Y value is 37 or less. In the invention, the Y value is used as an index showing the darkness or lightness of the charge generating layer. The Y value is one element of the three excitation values in the XYZ color system showing an object color, and can be measured by a commercially available colormeasuring apparatus, for example, MCPD-2000 produced by Otsuka Electronics Co., Ltd. The larger the Y value is, the smaller the film thickness is, and since a Y value of more than 37 produces an interference fringe on an image, the Y value needs to be 37 or less. The interference fringe is a phenomenon which is caused in such a case where incident light is not completely absorbed in the charge generating layer and is released as reflected light, which interferes subsequent incident light. When the Y value is more than 37, the color of the charge generating layer is too light, and absorption of the incident light becomes insufficient, whereby reflected light is formed to generate the interference fringe.

The photoreceptor of the invention is realized by containing TiOPc as a charge generating material and by making the charge generating layer to have the Y value to 37 or less, and there is no necessity to separately process the surface of the support, to form another layer on the support, or to mix a light scattering substance in the adhesive layer between the support and the charge generating layer for irregular reflection of incident light. Therefore, the coating property upon forming the layer on the support is not deteriorated, and the electric characteristics of the photoreceptor are not deteriorated. It is also not necessary to change the material for the electroconductive support itself to make it transparent. Thus, the invention does not bring about increase of the production cost.

In the invention it is preferable that the Y value of the charge generating layer is 35 or less.

According to the invention, the Y value is 35 or less, and accordingly the interference fringe caused by the incident light and the reflected light on the support of the laser light is stably suppressed in image formation.

In the invention it is preferable that the oxotitanyl phthalocyanine has major diffraction peaks at Bragg angles ($2\theta \pm 0.2°$) of $7.3°$, $9.4°$, $9.6°$, $11.6°$, $13.3°$, $17.9°$, $24.1°$ and $27.2°$ in an X-ray diffraction spectrum.

According to the invention, the charge generating layer contains the TiOPc having the diffraction peaks, so that the photoreceptor exhibits high sensitivity to the laser light.

In the invention it is preferable that in the X-ray diffraction spectrum of the oxotitanyl phthalocyanine, a bundle of peaks formed by the diffraction peaks at the Bragg angles ($2\theta \pm 0.2°$) of $9.4°$ and $9.6°$ which overlap each other, is a maximum intensity of diffraction, and the peak at the Bragg angle ($2\theta \pm 0.2°$) of $27.2°$ is a second maximum intensity of diffraction.

According to the invention, the charge generating layer contains the TiOPc having the diffraction peaks in the X-ray diffraction spectrum, so that the photoreceptor exhibits further high sensitivity to the laser light.

The invention also relates to a coating liquid for a charge generating layer of an electrophotographic photoreceptor comprising an electroconductive support, and a photosensitive layer on the electroconductive support, including at least a charge generating layer and a charge transporting layer accumulated thereon, the coating liquid comprising oxotitanyl phthalocyanine as a charge generating material, and having a turbidity in a range of from 180 to 350.

According to the invention, the coating liquid containing TiOPc and having a turbidity adjusted to a range of from 180 to 350 is coated on an electroconductive support, so as to produce the charge generating layer. The turbidity herein is an index expressing an extent of turbidity caused by insoluble matters in a liquid, and is defined as a ratio (Td/Tp), when parallel light is incident from a light source on a cell filled with the liquid, of light scattered by turbidity in the liquid (Td: diffusion transmitted light) to light transmitted as parallel (Tp: parallel transmitted light). The turbidity can be measured by a commercially available turbidity meter, such as SEP-PT-501D produced by Mitsubishi Kasei Co., Ltd. The photoreceptor having such a charge generating layer exhibits high sensitivity to the laser light owing to TiOPc contained, and can form an image without generating an interference fringe due to the laser light. In the invention, the interference fringe can be suppressed by making the turbidity of the coating liquid 180 or more. However, when the turbidity exceeds 350, the electric characteristics are deteriorated due to defective dispersion. Therefore, it is necessary that the turbidity is 350 or less. The interference fringe is a phenomenon caused by the mechanism in that incident light is not completely absorbed in the charge generating layer to be released as reflected light, which interferes subsequent incident light. When the turbidity is less than 180, the color of the charge generating layer thus formed is too light, and absorption of the incident light becomes insufficient, whereby reflected light is formed to generate the interference fringe.

In general, when the Y value becomes small, the film thickness of the charge generating layer becomes large, whereby the electric characteristics are enhanced, particularly the residual potential is increased. However, by using the coating liquid having the turbidity according to the invention, a low Y value can be realized even in the case where the film thickness of the charge generating layer is small, and thus the generation of interference fringe and the increase of residual potential can be suppressed at a time.

Furthermore, because the charge generating layer of the photoreceptor is produced by using the coating liquid containing TiOPc as a charge generating material and having a turbidity in a range of from 180 to 350, there is no necessity to separately process the surface of the support, to form another layer on the support, or to mix a light scattering substance in the adhesive layer between the support and the charge generating layer for irregular reflection of incident light. Therefore, the coating property upon forming the layer on the support is not deteriorated, and the electric characteristics of the photoreceptor are not deteriorated. It is also not necessary to change the material for the electroconductive support itself to make it transparent. Thus, the invention does not bring about increase of the production cost.

In the invention it is preferable that the turbidity of the coating liquid is in a range of from 200 to 350.

According to the invention, when the turbidity of the coating liquid is 200 or more, a charge generating layer produced by the coating liquid can stably suppress the interference fringe to form an image.

In the invention it is preferable that the oxotitanyl phthalocyanine in the coating liquid to produce the charge generating layer has major diffraction peaks at Bragg angles (2θ±0.2°) of 7.3°, 9.4°, 9.6°, 11.6°, 13.3°, 17.9°, 24.1° and 27.2° in an X-ray diffraction spectrum.

According to the invention, the coating liquid comprises the TiOPc having the diffraction peaks in the X-ray diffraction spectrum, so that an electrophotographic photoreceptor can be produced that exhibits high sensitivity to the laser light.

In the invention it is preferable that in the X-ray diffraction spectrum of the oxotitanyl phthalocyanine in the coating liquid to produce the charge generating layer, a bundle of peaks formed by the diffraction peaks at the Bragg angles (2θ±0.2°) of 9.4° and 9.6° which overlap each other, is a maximum intensity of diffraction, and the peak at the Bragg angle (2θ±0.2°) of 27.2° is a second maximum intensity of diffraction.

According to the invention, the coating liquid comprises the TiOPc having the diffraction peaks in the X-ray diffraction spectrum, so that the photoreceptor which exhibits further high sensitivity to the laser light can be produced.

The invention also relates a method for manufacturing an electrophotographic photoreceptor comprising an electroconductive support, and a photosensitive layer on the electroconductive support, including at least a charge generating layer and a charge transporting layer accumulated thereon, the method comprising:

forming the charge generating layer using a coating liquid comprising oxotitanyl phthalocyanine as a charge generating material and having a turbidity in a range of from 180 to 350.

According to the intention, a photoreceptor which exhibits high sensitivity to the laser light and is capable of forming an image without generating an interference fringe due to laser light can be produced without deterioration in electric characteristics of the photoreceptor and increase in production cost.

In the invention it is preferable that the oxotitanyl phthalocyanine has major diffraction peaks at Bragg angles (2θ±0.2°) of 7.3°, 9.4°, 9.6°, 11.6°, 13.3°, 17.9°, 24.1° and 27.2° in an X-diffraction spectrum.

According to the invention, a photoreceptor which exhibits high sensitivity to the laser light and is capable,of forming an image without generating an interference fringe due to laser light can be produced without deterioration in coating property, deterioration in electric characteristics of the photoreceptor, and increase in production cost.

In the invention it is preferable that in the X-ray diffraction spectrum of the oxotitanyl phthalocyanine, a bundle of peaks formed by the diffraction peaks at the Bragg angles (2θ±0.2°) of 9.4° and 9.6° which overlap each other, is a maximum intensity of diffraction, and the peak at the Bragg angle (2θ±0.2°) of 27.2° is a second maximum intensity of diffraction.

According to the invention, a photoreceptor which exhibits high sensitivity to the laser light and is capable of forming an image without generating an interference fringe due to laser light can be produced without deterioration in electric characteristics and with improved coating properties, but not causing increase in production cost.

The formation of a film on an electroconductive support in a drum form is generally conducted by using a dip coating method. In the dip coating method, the support is immersed in a coating bath filled with the coating liquid for forming the charge generating layer, and then withdrawn therefrom. At this time, the Y value is controlled by the withdrawing rate. In the conventional coating liquid for forming a charge generating layer containing crystalline TiOPc, the change of the Y value with respect to the withdrawing rate is small, and thus it is difficult to control the Y value by the withdrawing rate. However, in the coating liquid for a charge generating layer containing crystalline TiOPc according to the invention, the change of the Y value with respect to the withdrawing rate is larger than that of the conventional one, and thus the Y value can be easily controlled. Therefore, the Y value within the range of the invention can be obtained by controlling only the withdrawing rate.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
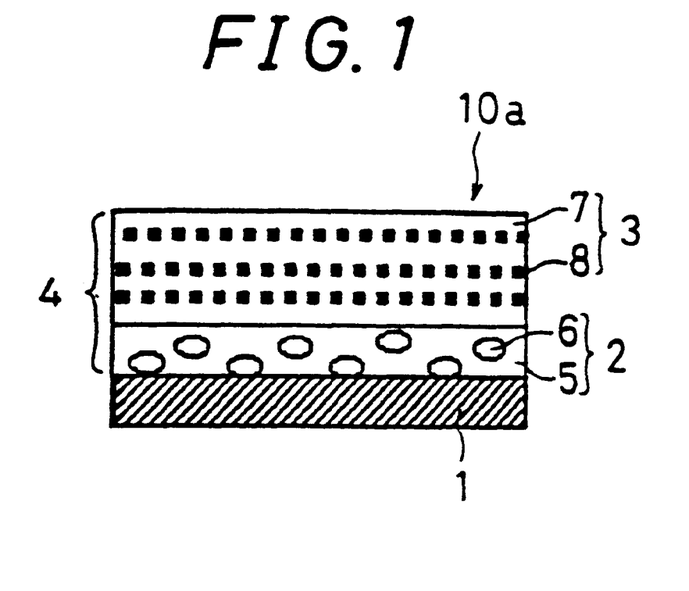
FIG. 1 is a cross sectional view showing an electrophotographic photoreceptor 10a as one embodiment of the invention.

FIG. 1 is a cross sectional view showing an electrophotographic photoreceptor 10a as one embodiment of the invention. The photoreceptor 10a is a function separated type (accumulation type) photoreceptor constituted by forming a photosensitive layer 4 on an electroconductive support 1, in which the photosensitive layer 4 is constituted by accumulating a charge generating layer 2 containing a binder resin 5 and a charge generating material 6, and a charge transporting layer 3 containing a binder resin 7 and a charge transporting material 8.

Figure 2:
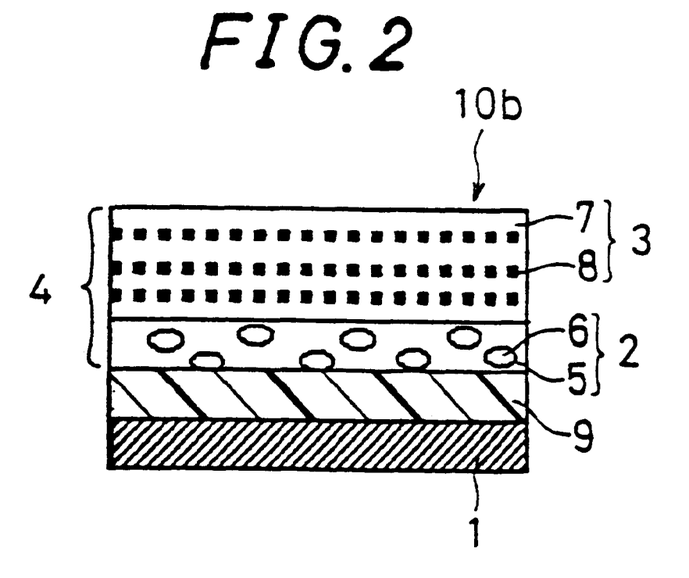
FIG. 2 is a cross sectional view showing an electrophotographic photoreceptor 10b as another embodiment of the invention.

FIG. 2 is a cross sectional view showing an electrophotographic photoreceptor 10b as another embodiment of the invention. The photoreceptor 10b is formed by providing an undercoating layer 9 between the electroconductive support 1 and the photosensitive layer 4.

In the invention, the basic structure of TiOPc used as the charge generating material 6 is expressed by the following general formula (I).

(I)

In the general formula (I), $X_1$ to $X_4$ each represents a hydrogen atom, a halogen atom, an alkyl group or an alkoxy group, and k, l, m and n each represents an integer of from 0 to 4.

A general synthesis method of TiOPc is known and disclosed in "Phthalocyanine Compounds" by Moser and Thomas, but it may be produced by other synthesis methods.

For example, dichlorotitanium phthalocyanine can be obtained at a high yield by a method of heat fusing o-phtalonitrile and titanium tetrachloride or a method of heating in the presence of an organic solvent, such as α-chloronaphthalene. The resulting dichlorotitanium phthalocyanine is hydrolyzed with a base or water to obtain a TiOPc liquid, A TiOPc liquid can also be obtained by a method of heating 1,3-diiminoisoindoline and tetrabutoxytitanium in the presence of an organic solvent, such as N-methylpyrrolidone. The resulting TiOPc liquid may contain a phthalocyanine derivative in that the hydrogen atom on the benzene ring is substituted by a substituent, such as chlorine, fluorine, a nitro group, a cyano group or a sulfonic group.

Crystalline TiOPc can be obtained by treating the TiOPc liquid with a water-immiscible organic solvent, such as dichloroethane, in the presence of water. Examples of the method for treating the TiOPc with a water-immiscible organic solvent in the presence of water for obtaining the crystal type specified in the invention include a method where the TiOPc is swollen with water and treated with the organic solvent, and a method where water is added to the organic solvent, and the TiOPc powder is put thereinto without conducting the swelling treatment, but it is not limited to these methods. Examples of the method for swelling the TiOPc with water include a method where the TiOPc is dissolved in sulfuric acid and deposited in water to form a wet paste, and a method where the TiOPc is swollen with water by using an agitation and dispersion apparatus, such as a homomixer, a paint mixer, a ball mill and a sand mill, but it is not limited to these methods.

The TiOPc having the limited crystal type according to the invention can also be obtained by agitating for a sufficient period of time or milling with a mechanical force the TiOPc liquid in a solution or a solution having the binder resin dissolved therein. Examples of an apparatus used in the agitation treatment include, in addition to general agitating apparatus, a homomixer, a paint mixer, a disperser, an agiter, a ball mill, a sand mill, a paint shaker, a Dyno-mill, an attritor and an ultrasonic dispersing apparatus. After the treatment, the crystals are filtered off and then washed with methanol, ethanol or water, followed by isolating. In alternative, after the treatment, the crystals may be used as the coating liquid as they are after adding the binder resin. When the binder resin is added on the treatment, it can be used as the coating liquid as it is.

As the charge generating material 6 contained in the charge generating layer 2, other charge generating materials 6 may be contained in addition to the TiOPc obtained by the method described in the foregoing.

The charge generating layer 2 contains the binder resin 5. As the binder resin 5, a polyester resin, polyacrylate, polymethacrylate, polycarbonate, polyvinyl chloride, polyvinyl acetate, polyvinyl acetoacetal, polyvinyl propional, polyvinyl butyral, a phenoxy resin, an epoxy resin, a urethane resin, cellulose ester, cellulose ether and a copolymer thereof may be used singly or in combination of two or more of them.

The coating liquid for a charge generating layer contains a solvent in addition to the binder resin 5 and the charge generating material 6. As the solvent, a ketone, such as acetone, methyl ethyl ketone, methyl isobutyl ketone and cyclohexanone, an ester, such as ethyl acetate and butyl acetate, an ether, such as tetrahydrofuran and dioxane, an aromatic hydrocarbon, such as benzene, toluene and xylene, and a non-protonic polar solvent, such as N,N-dimethylformamide and dimethylsulfoxide, may be used singly or in combination of two or more of them.

The coating liquid for a charge generating layer may be produced in such a manner that one kind or two or more kinds of each of the binder resin 5, the charge generating material 6 and the solvent are mixed and then dispersed by a dispersion apparatus, so as to adjust the turbidity to a range of from 180 to 350. In alternative, the dispersion treatment is further conducted to adjust the turbidity to a range of from 200 to 350. Examples of the apparatus used for the dispersion treatment include, in addition to general dispersing apparatus, a homomixer, a paint mixer, a disperser, an agiter, a ball mill, a sand mill, a paint shaker, a Dyno-mill, an attritor and an ultrasonic dispersing apparatus.

The coating liquid for a charge generating layer containing the TiOPc of the invention is not limited to those produced by the method described in the foregoing. That is, the coating liquid may be produced by any method as far as it has the turbidity specified in the invention.

Examples of the material of the electroconductive support 1 include those materials that have electroconductivity by themselves, such as aluminum, an aluminum alloy, copper, zinc, stainless steel, nickel and titanium, and furthermore plastics or paper having vapor-deposited thereon aluminum, gold, silver, copper, zinc, nickel, titanium, indium oxide or tin oxide, plastics or paper containing electroconductive particles, and plastics containing an electroconductive polymer may also be used. They may be used in the form of a drum, a sheet or a seamless belt.

The charge generating layer 2 may be formed, in the case of a sheet, by using a baker applicator, a bar coater, casting or spin coating, and in the case of a drum, by using a spraying method, a vertical ring method or a dip coating method. At this time, the desired Y value of 37 or less, particularly 35 or less, is obtained by controlling the film thickness of the charge generating layer 2.

Examples of the charge transporting material 8 contained in the charge transporting layer 3 include a polymer compound, such as polyvinyl carbazole and polysilane, and a low molecular weight compound, such as a hydrazone compound, a pyrazoline compound, an oxadiazole compound, a stilbene compound, a triphenylmethane compound, a triphenylamine compound and an enamine compound.

Examples of the binder resin 7 contained in the charge transporting layer 3 include a vinyl polymer and a copolymer thereof, such as polymethyl methacrylate, polystyrene and polyvinyl chloride, and polycarbonate, polyester, polyester polycarbonate, polysulfone, phenoxy, epoxy and silicone resins. These resins may be used singly or in combination of two or more of them, and a copolymer of monomers for constituting these resins and a thermosetting resin obtained by partially crosslinking them may also be used.

The coating liquid for a charge transporting layer contains a solvent in addition to the binder resin 7 and the charge transporting material 8. As the solvent, a halogen type solvent, such as dichloromethane and 1,2-dichloroethane, a ketone, such as acetone, methyl ethyl ketone, and cyclohexanone, an ester, such as ethyl acetate and butyl acetate, an ether, such as tetrahydrofuran and dioxane, an aromatic hydrocarbon, such as benzene, toluene and xylene, and a non-protonic polar solvent, such as N,N-dimethylformamide and dimethylsulfoxide, may be used.

The charge transporting layer 3 may be formed by adding the binder resin 7 to the charge transporting material 8 dissolved in the solvent, and then, in the case of a sheet, by using a baker applicator, a bar coater, casting or spin coating, and in the case of a drum, by using a spraying method, a vertical ring method or a dip coating method.

The charge transporting layer 3 preferably has a thickness of from 5 to 60 $\mu$m, and more preferably from 10 to 40 $\mu$m The charge generating layer 2 and the charge transporting layer 3 may further contain, depending on necessity, various additives, such as a leveling agent, an antioxidant and a sensitizer. Examples of the antioxidant include vitamin E, hydroquinone, hindered amine, hindered phenol, paraphenylene diamine, arylalkane and a derivative thereof, an organic sulfur compound and an organic phosphorous compound.

Examples of the undercoating layer 9 provided between the electroconductive support 1 and the photosensitive layer 4 include an inorganic film, such as an anodic oxide film of aluminum, aluminum oxide, aluminum hydroxide and titanium oxide, and further include polyvinyl alcohol, polyvinyl butyral, polyvinyl pyrrolidone, a polyacrylic acid, a cellulose compound, gelatin, starch, polyurethane, polyimide, polyamide, casein and N-methoxymethylated nylon. Furthermore, particles of titanium oxide, tin oxide and aluminum oxide may be dispersed in these materials.

As the outermost layer of the photosensitive layer 4, an overcoating layer mainly containing, for example, a thermoplastic resin or a thermosetting resin may be provided.

While the charge transporting layer 3 is generally formed on the charge generating layer 2, the reverse order may also be employed. As the method for forming the layers, a known method can be applied, in which, for example, substances to be contained in the layer are dissolved or dispersed in a solvent, and the resulting coating liquids are coated one by one.

The invention will be specifically described with reference to the examples below, but the invention is not construed as being limited thereto as far as it does not exceed the gist thereof.

Production Example 1

40 g of o-phthalodinitrile, 18 g of titanium tetrachloride and 500 ml of α-chloronaphthalene were reacted by heating and agitating in a nitrogen atmosphere at 200 to 250° C. for 3 hours, and after standing to cool to 100 to 130° C., filtered under hot, and the reaction product was washed with 200 ml of α-chloronaphthalene heated to 100° C. to obtain a crude product of dichlorotitanium phthalocyanine. The crude product was washed at room temperature with 200 ml of α-chloronaphthalene and then with 200 ml of methanol, and was further washed by suspending under hot in 500 ml of methanol for 1 hour. The crude product obtained by filtering was repeatedly washed by suspending under hot in 500 ml of water until the pH became 6 to 7, and it was dried to obtain TiOPc crystals. When the crystals were subjected to X-ray diffractiometry, the spectrum shown in FIG. 3 was obtained. It is understood from FIG. 3 that the crystals are crystalline TiOPc called Y type disclosed in JP-A 64-17066 having a maximum diffraction peak at a Bragg angle (2θ±0.2°) of 27.3° and diffraction peaks at Bragg angles (2θ±0.2°) of 9.5°, 9.7°, 11.7°, 15°, 23.5° and 24.1°.

Figure 3:
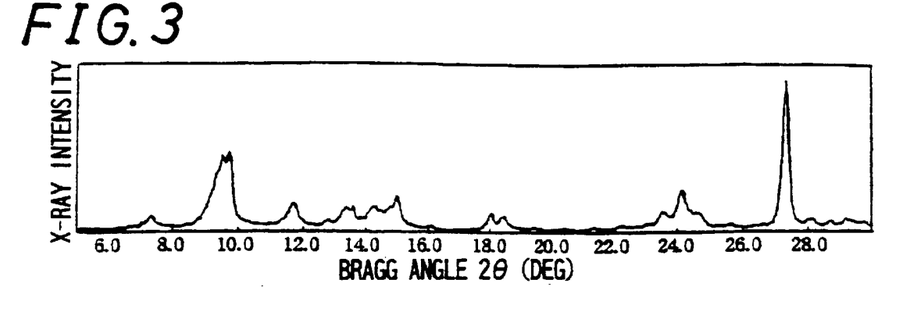
FIG. 3 is a graph showing an X-ray diffraction spectrum of TiOPc crystals obtained in Production Example 1.

The X-ray diffraction spectrum was measured under the following conditions
X-ray source: CuKα=1.54050 Å
Voltage: 30 to 40 kV
Electric current: 50 mA
Start angle: 5.0 deg.
Stop angle: 30.0 deg.
Step angle: 0.01 to 0.02 deg.
Measurement time: 0.5 to 2.0 deg./min.
Measurement method: θ/2θ scanning method 0.8 g of the TiOPc crystals as a charge generating material 6 and 0.4 g of polyvinyl butyral (S-Lec BL-1 produced by Sekisui Chemical Co., Ltd.) as a binder resin 5 were mixed with 60 g of methyl ethyl ketone, which were subjected to a dispersion treatment by a ball mill apparatus along with 40 g of glass beads having a diameter of 2 mm, so as to obtain a coating liquid 1 for a charge generating layer containing TiOPc of the invention having a turbidity of 181. When 8 ml of the coating liquid was dropped on an aluminum plate, and after drying, it was subjected to the measurement of an X-ray diffraction spectrum under the same conditions as above, the same diffraction spectrum as FIG. 3 showing Y type crystals was obtained.

Production Example 2

Figure 4:
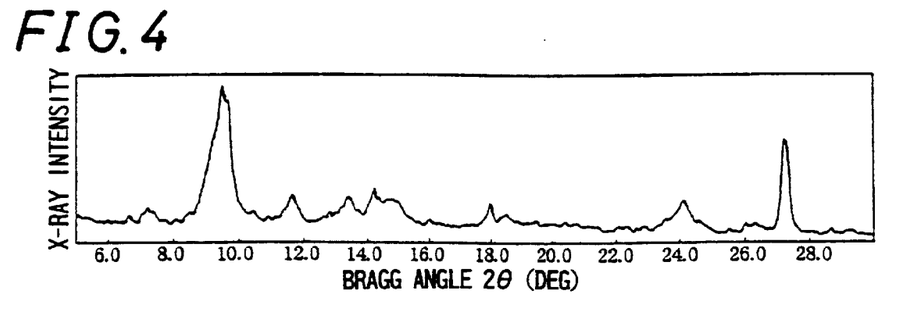
FIG. 4 is a graph showing an X-ray diffraction spectrum of TiOPc crystals obtained in Production Example 2.

The TiOPc crystals obtained in Production Example 1 were mixed with methyl ethyl ketone and subjected to a milling treatment by a paint conditioner apparatus (produced by Red Level Inc.) along with glass beads having a diameter of 2 mm, and after washed with methanol, they were dried to obtain TiOPc crystals. The X-ray diffraction spectrum of the resulting crystals measured under the same conditions as in Production Example 1 is shown in FIG. 4. It is understood that the crystals are TiOPc having the crystal type of the invention having diffraction peaks at Bragg angles (2θ±0.2°) of 7,3°, 9.4°, 9.6°, 11.6°, 13,3°, 17.9°, 24.1° and 27.2°, a bundle of peaks formed by the diffraction peaks at the Bragg angles (2θ±0.2°) of 9.4° and 9.6° which overlap each other s a maximum diffraction peak, and the peak at the Bragg angle (2θ±0.2°) of 27.2° is a second maximum diffraction peak.

The TiOPc crystals and polyvinyl butyral (S-Lec BL-1 produced by Sekisui Chemical Co., Ltd.) were mixed with methyl ethyl ketone and subjected to a milling treatment by a beads mill apparatus along with glass beads having a diameter of 2 mm, so as to obtain a coating liquid 2 for a charge generating layer containing TiOPc according to the invention having a turbidity of 206. When the coating liquid 2 was subjected to the measurement of an X-ray diffraction spectrum under the same conditions as in Production Example 1, the same diffraction spectrum as FIG. 4 was obtained.

Production Example 3

Figure 5:
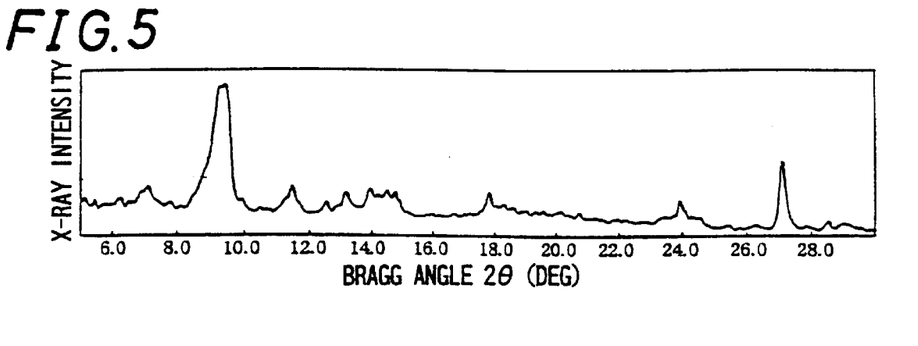
FIG. 5 is a graph showing an X-ray diffraction spectrum of the coating liquid for a charge generating layer 3 containing TiOPc obtained in Production Example 3.

The TiOPc crystals obtained in Production Example 1 and polyvinyl butyral (S-Lec BL-1 produced by Sekisui Chemical Co., Ltd.) as a binder resin 5 were mixed with methyl ethyl ketone and subjected to a milling treatment by a paint conditioner apparatus along with glass beads having a diameter of 2 mm, so as to obtain a coating liquid 3 for a charge generating layer containing TiOPc according to the invention having a turbidity of 215. The coating liquid exhibits the X-ray diffraction spectrum shown in FIG. 5 under the same conditions as in Production Example 1. In FIG. 5, the crystals exhibit diffraction peaks at Bragg angles (2θ±0.2°) of 7.3°, 9.4°, 9.6°, 11.6°, 13.3°, 17.9°, 24.1° and 27.2°, of which the diffraction peaks at the Bragg angles (2θ±0.2°) of 9.4° and 9.6° overlap each other and form a bundle of peaks which is a maximum intensity of diffraction, and the peak at the Bragg angle (2θ±0.2°) of 27.2° is a second maximum intensity of diffraction, and thus it is understood that the crystals are TiOPc having the crystal type of the invention.

Production Example 4

The TiOPc crystals obtained in Production Example 1 and polyvinyl butyral (BM-1 produced by Sekisui Chemical Co., Ltd.) as a binder resin 5 were mixed with cyclohexanone and subjected to a milling treatment by a paint conditioner apparatus along with glass beads having a diameter of 2 mm, so as to obtain a coating liquid 4 for a charge generating layer containing TiOPc according to the invention having a turbidity of 220. The X-ray diffraction spectrum of the coating liquid 4 has, as similar to FIG. 5 under the same conditions as in Production Example 1, diffraction peaks at Bragg angles (2θ±0.7°) of 7.3°, 9.4°, 9.6°, 11.6°, 13.3°, 17.9°, 24.1° and 27.2°, of which the diffraction peaks at the Bragg angles (2θ±0.2°) of 9.4° and 9.6° overlap each other and form a bundle of peaks, which is a maximum intensity of diffraction, and the peak at the Bragg angle (2θ±0.2°) of 27.2° is a second maximum intensity of diffraction, and thus it is understood that the crystals are TiOPc having the crystal type of the invention.

Comparative Production Example 1

Figure 6:
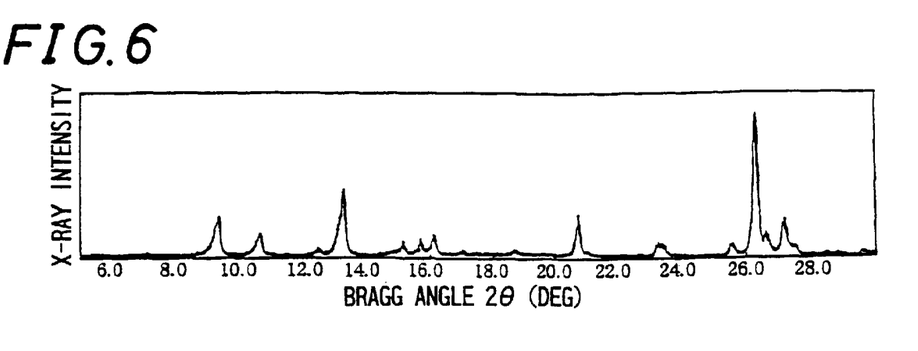
FIG. 6 is a graph showing an X-ray diffraction spectrum of the coating liquid for a charge generating layer 5 containing TiOPc obtained in Comparative Production Example 1.

The TiOPc crystals obtained in Production Example 1 and polyvinyl butyral (BX-1 produced by Sekisui Chemical Co., Ltd.) as a binder resin 5 were mixed with tetrahydrofuran and subjected to a milling treatment by a beads mill apparatus along with glass beads having a diameter of 1 mm, so as to obtain a coating liquid 5 for a charge generating layer containing TiOPc having a turbidity of 105. The coating liquid 5 exhibits the X-ray diffraction spectrum shown in FIG. 6 under the same conditions as in Production Example 1. It is understood from FIG. 6 that the crystals are crystalline TiOPc called A type disclosed in JP-A 62-67094 having the maximum diffraction peak at a Bragg angle (2θ±0.2°) of 26.3° and diffraction peaks at 9.3°, 10.6°, 13.2°, 15.1°, 15.7°, 16.1°, 20.8°, 23.3° and 27.1°.

EXAMPLE 1

An aluminum-made support of a drum form was used as an electroconductive support 1, and a coating liquid for an undercoating layer formed by dissolving titanium oxide and a copolymer nylon (CM8000 produced by Toray Co., Ltd. in a mixed solvent of methyl alcohol and 1,3-dioxolane was coated on the support 1 by a general dip coating method, in which the support 1 was immersed in a coating bath filled with the coating liquid and then withdrawn therefrom to form a thin film on the support, followed by drying, so as to form an undercoating layer 9 having a film thickness of 1 μm.

The coating liquid 1 for a charge generating layer containing the TiOPc of the invention obtained in Production Example 1 was coated on the undercoating layer 9 in the same dip coating method as above, and then dried to form a charge generating layer 2 having a Y value of 36.5. The withdrawing rate of the support 1 herein was 4.0 mm/sec.

An enamine compound represented by the following structural formula (II) was mixed with a polycarbonate resin (PCZ-200 produced by Mitsubishi Gas Chemical Company, Inc.) at a ratio of 1/1, and a solution of 21% by weight was prepared by using tetrahydrofuran as a solvent. The solution was coated on the charge generating layer 2 in the same dip coating method as above, and then dried to form a charge transporting layer 3 having a film thickness of 20 μm.

(II)

A photoreceptor sample 1 of a function separated type having the undercoating layer 9, the charge generating layer 2 and the charge transporting layer 3 was obtained in the foregoing manner.

EXAMPLE 2

An aluminum-made support of a drum form was used as an electroconductive support 1, and a coating liquid for an undercoating layer was produced by dissolving titanium oxide and a copolymer nylon (CM8000 produced by Toray Co., Ltd.) in a mixed solvent of methyl alcohol and 1,3-dioxolane, which was coated on the support 1 by the general dip coating method, followed by drying, so as to form an undercoating layer 9 having a film thickness of 1 μm.

The coating liquid 1 for a charge generating layer containing the TiOPc of the invention obtained in Production Example 1 was used as a coating liquid for a charge generating layer, which was coated on the undercoating layer 9 in the same coating method as above, and then dried to form a charge generating layer 2 having a Y value of 36. The withdrawing rate of the support 1 herein was 7.0 mm/sec.

A hydrazone type compound represented by the following structural formula (III) as a charge transporting material 8 was mixed with a polycarbonate resin (PCZ-200 produced by Mitsubishi Gas Chemical Company, Inc.) at a ratio of 1/1, and a solution of 21% by weight was prepared by using tetrahydrofuran as a solvent. The solution was coated on the charge generating layer 2 in the same dip coating method as above, and then dried to form a charge transporting layer 3 having a dry film thickness of 25 μm.

(III)

A photoreceptor sample 2 of a function separated type having the undercoating layer 9, the charge generating layer 2 and the charge transporting layer 3 was obtained in the foregoing manner.

EXAMPLE 3

An aluminum-made support of a drum form was used as an electroconductive support 1, and the coating liquid 2 for a charge generating layer containing the TiOPc of the invention obtained in Production Example 2 as a coating liquid for a charge generating layer was directly coated on the support 1 by the general dip coating method, followed by drying, so as to form a charge generating layer 2 having a Y value of 36. The withdrawing rate of the support 1 herein was 4.0 mm/sec.

With respect to the charge transporting layer 3, a butadiene type compound represented by the following structural formula (IV) was used as a charge transporting material 8, and after mixing it with a polycarbonate resin (PCZ-200 produced by Mitsubishi Gas Chemical Company, Inc.) at a ratio of 1/1, a solution of 21% by weight was prepared by using tetrahydrofuran as a solvent. The solution was coated on the charge generating layer 2 to form a charge transporting layer 3 having a dry film thickness of 25 μm. A photoreceptor sample 3 of a function separated type having no undercoating layer 9 was obtained in the foregoing manner.

(IV)

EXAMPLE 4

An aluminum-made support of a drum form was used as an electroconductive support 1, and a coating liquid for an undercoating layer was produced by dissolving titanium oxide and a copolymer nylon (CM8000 produced by Toray Co., Ltd.) in a mixed solvent of methyl alcohol and 1,3-dioxolane, which was coated on the support 1 by the general dip coating method, followed by drying, so as to form an undercoating layer 9 having a film thickness of 1 μm.

The coating liquid 2 containing the TiOPc of the invention obtained in Production Example 2 was used as a coating liquid for a charge generating layer, which was coated on the undercoating layer 9 in the same coating method as above, and then dried to form a charge generating layer 2 having a Y value of 32. The withdrawing rate of the support 1 herein was 7.0 mm/sec.

The enamine compound represented by the structural formula (II) as the charge transporting material 8 was mixed with a polycarbonate resin (PCZ-200 produced by Mitsubishi Gas Chemical Company, Inc.) at a ratio of 1/1, and a solution of 21% by weight was prepared by using tetrahydrofuran as a solvent. The solution was coated on the charge generating layer 2 to form a charge transporting layer 3 having a dry film thickness of 25 μm.

A photoreceptor sample 4 of a function separated type having the undercoating layer 9, the charge generating layer 2 and the charge transporting layer 3 was obtained in the foregoing manner.

EXAMPLE 5

The coating liquid 3 containing the TiOPc of the invention obtained in Production Example 3 was used as a coating liquid for a charge generating layer, and the hydrazone compound of the structural formula (III) was used as the charge transporting material 8, whereby a photoreceptor sample 5 of a function separated type having no undercoating layer similar to Example 3 was obtained by the dip coating method. At this time, the Y value of the charge generating layer 2 was 35, and the withdrawing rate of the support 1 upon forming the charge generating layer was 5.0 mm/sec.

EXAMPLE 6

An aluminum-made support of a drum form was used as an electroconductive support 1, and a coating liquid for an undercoating layer was produced by dissolving titanium oxide and a copolymer nylon (CM8000 produced by Toray Co., Ltd.) in a mixed solvent of methyl alcohol and 1,3-dioxolane, which was coated on the support 1 by the general dip coating method, followed by drying, so as to form an undercoating layer 9 having a film thickness of 1 μm.

The coating liquid 4 for a charge generating layer containing the TiOPc of the invention obtained in Production Example 4 was used as a coating liquid for a charge generating layer, which was coated on the undercoating layer 9 in the same coating method as above, and then dried to form a charge generating layer 2 having a Y value of 36.5. The withdrawing rate of the support 1 herein was 4.0 mm/sec.

The enamine compound represented by the structural formula (II) was mixed with a polycarbonate resin (PCZ-200 produced by Mitsubishi Gas Chemical Company, Inc.) at a ratio of 1/1, and a solution of 21% by weight was prepared by using tetrahydrofuran as a solvent. The solution was coated on the charge generating layer 2 in the same coating method as above to form a charge transporting layer 3 having a dry film thickness of 25 μm.

A photoreceptor sample 6 of a function separated type having the undercoating layer 9, the charge generating layer 2 and the charge transporting layer 3 was obtained in the foregoing manner.

EXAMPLE 7

An aluminum-made support of a drum form was used as an electroconductive support 1, and a coating liquid for an undercoating layer was produced by dissolving titanium oxide and a copolymer nylon (CM8000 produced by Toray Co., Ltd) in a mixed solvent of methyl alcohol and 1,3-dioxolane, which was coated on the support 1 by the general dip coating method, followed by drying, so as to form an undercoating layer 9 having a film thickness of 1 μm.

The coating liquid 4 for a charge generating layer containing the TiOPc of the invention obtained in Production Example 4 was used as a coating liquid for a charge generating layer, which was coated on the undercoating layer 9 in the same coating method as above, and then dried to form a charge generating layer 2 having a Y value of 31. The withdrawing rate of the support 1 herein was 8.0 mm/sec.

The enamine compound represented by the structural formula (II) was mixed with a polycarbonate resin (PCZ-200 produced by Mitsubishi Gas Chemical Company, Inc.) at a ratio of 1/1, and a solution of 21% by weight was prepared by using tetrahydrofuran as a solvent. The solution was coated on the charge generating layer 2 in the same coating method as above to form a charge transporting layer 3 having a dry film thickness of 25 μm.

A photoreceptor sample 7 of a function separated type having the undercoating layer 9, the charge generating layer 2 and the charge transporting layer 3 was obtained in the foregoing manner.

Comparative Example 1

The coating liquid 5 for a charge generating layer containing the TiOPc obtained in Comparative Production Example 1 was used as a coating liquid for a charge generating layer, and the hydrazone compound of the structural formula (III) was used as the charge transporting material 8, whereby a photoreceptor sample 8 of a function separated type similar to Example 1 having accumulating structure of the undercoating layer 9, the charge generating layer 2 and the charge transporting layer 3 was obtained by the dip coating method. At this time, the Y value of the charge generating layer 2 was 42, and the withdrawing rate of the support 1 upon forming the charge generating layer was 4.0 mm/sec.

Comparative Example 2

A photoreceptor sample 9 of a function separated type was obtained in the same manner as in Comparative Example 1 except that a charge generating layer 2 having a color that was darker than Comparative Example 1 was formed by using the coating liquid 5 for a charge generating layer containing the TiOPc obtained in Comparative Production Example 1 as a coating liquid for a charge generating layer. At this time, the Y value of the charge generating layer 2 was 37, and the withdrawing rate of the support 1 upon forming the charge generating layer was 15.0 mm/sec.

Comparative Example 3

A photoreceptor sample 10 of a function separated type having no undercoating layer 9 was obtained in the same manner as in Example 3 except that a charge generating layer 2 was formed by using the coating liquid 2 for a charge generating layer containing the TiOPc obtained in Production Example 2 as a coating liquid for a charge generating layer at a far lower withdrawing rate, and the hydrazone compound of the structural formula (III) was used as the charge transporting material 8. At this time, the Y value of the charge generating layer was 40, and the withdrawing rate of the support 1 upon forming the charge generating layer was 1.0 m/sec.

The samples 1 to 10 produced in Examples 1 to 7 and Comparative Examples 1 to 3 are shown in Table 1 below.

TABLE 1

| Sample No. | Example No. | Undercoating layer | Coating liquid for charge generating layer | Crystal form | Turbidity | Y value | Charge transporting material |
|---|---|---|---|---|---|---|---|
| Sample 1 | Example 1 | present | Production Example 1 | Y form crystals | 181 | 36.5 | Example compound 2 |
| Sample 2 | Example 2 | present | Production Example 1 | Y form crystals | 181 | 36 | Example compound 3 |
| Sample 3 | Example 3 | none | Production Example 2 | crystals of invention | 206 | 36 | Example compound 4 |
| Sample 4 | Example 4 | present | Production Example 2 | crystals of invention | 206 | 32 | Example compound 2 |
| Sample 5 | Example 5 | none | Production Example 3 | crystals of invention | 215 | 35 | Example compound 3 |
| Sample 6 | Example 6 | present | Production Example 4 | crystals of invention | 220 | 36.5 | Example compound 2 |
| Sample 7 | Example 7 | present | Production Example 4 | crystals of invention | 220 | 31 | Example compound 2 |
| Sample 8 | Comparative Example 1 | present | Comparative Production Example 1 | A form crystals | 105 | 42 | Example compound 3 |
| Sample 9 | Comparative Example 2 | present | Comparative Production Example 1 | A form crystals | 105 | 37 | Example compound 3 |
| Sample 10 | Comparative Example 3 | none | Production Example 2 | crystals of invention | 206 | 40 | Example compound 3 |

Major diffraction peaks of Y form crystals: 9.5°, 9.7°, 11.7°, 15.0°, 23.5°, 24.1°, 27.3°
Major diffraction peaks of A form crystals: 9.3°, 10.6°, 13.2°, 15.1°, 15.7°, 16.1°, 20.8°, 23.3°, 26.3°, 27.1°
Major diffraction peaks of crystals of the invention: 7.3°, 9.4°, 9.6°, 11.6°, 13.3°, 17.9°, 24.1°, 27.2°

(Evaluation)

The electrophotographic photoreceptor samples 1 to 10 thus produced were directly used as a photoreceptor of a commercially available digital duplicator (AR-5130 produced by Sharp Corp.) to obtain a half-tone image on A3 size ordinary paper, and evaluation for the presence and absence of an interference fringe and evaluation of the image were conducted.

They were also evaluated for electric characteristics by an electrostatic recording paper testing apparatus (EPA-8200 produced by Kawaguchi Electric Co., Ltd.). The measurement conditions were an applied voltage of −6 kV and a static of No. 3, and a residual potential $V_r$ and an initial potential $V_c$ upon exposure by using monochromic light of 780 nm (irradiated light: 2 μW/cm²) obtained by spectralized by an interference filter were measured The results are shown in Table 2.

TABLE 2

| | Evaluation of Half-tone image | | With-drawing rate (mm/sec) | Potential characteristics | |
|---|---|---|---|---|---|
| | Interference fringe | Evaluation of image* | | Initial potential (V) | Residual potential (V) |
| Example 1 | none | B | 4.0 | −503 | −25 |
| Example 2 | none | B | 7.0 | −515 | −20 |
| Example 3 | none | B | 4.0 | −489 | −28 |
| Example 4 | none | A | 7.0 | −500 | −8 |
| Example 5 | none | B | 5.0 | −490 | −22 |
| Example 6 | none | B | 4.0 | −510 | −11 |
| Example 7 | none | A | 8.0 | −520 | −8 |
| Comparative Example 1 | present | C | 4.0 | −498 | −17 |
| Comparative Example 2 | present | B | 15.0 | −495 | −50 |
| Comparative Example 3 | none | C | 1.0 | −499 | −15 |

Note:
*A: Satisfactory image with no interference fringe
B: No interference fringe
C: Deteriorated image with interference fringe As shown in Table 2, an interference fringe was formed in the evaluation of the half-tone images in Comparative Examples 1 and 3 where the charge generating layers 2 were formed with Y values of 42 and 40, and the image characteristics were deteriorated. On the other hand, formation of an interference fringe was not observed in the evaluation of the half-tone images in Examples 1 to 7, to which the invention was applied. In more detail, among Examples 3 to 7 produced by using the solutions having a turbidity of 200 or more, extremely satisfactory characteristics were stably obtained in the image evaluation of Examples 4 and 7 where the Y value of the charge generating layer 2 was 35 or less. In Example 5 where the charge generating layer 2 having a Y value of 35 was formed, although the electric characteristics were slightly inferior to Examples 4 and 7 due to the absence of the undercoating layer 9, no interference fringe was generated.

In Comparative Example 2, on the other hand, the charge generating layer 2 having a small Y value was formed by using the same coating liquid for a charge generating layer as in Comparative Example 1 and by making the withdrawing rate of the support 1 upon forming the charge generating layer at an extremely high rate, although no interference fringe was formed in the evaluation of the half-tone image, it was clearly inferior in electric characteristics since the initial potential was low and the residual potential was large even though the undercoating layer 9 was present.

Furthermore, in Examples 1 and 2 where the coating liquid for a charge generating layer containing the TiOPc of the Y type crystals, while the withdrawing rates of the support 1 upon forming the charge generating layer were 4.0 mm/sec and 7.0 mm/sec, respectively, which were greatly different from each other, the Y values of the resulting charge generating layers 2 were 36 and 36.5, respectively, the variation of which was small. Thus, it is understood that the Y value is difficult to be controlled only by the withdrawing rate in this crystal form, and it is necessary to change the physical property of the coating liquid. On the other hand, in Examples 3 to 7 where the coating liquids for a charge generating layer containing the TiOPc having the crystal forms of the invention, the change in Y value with respect to the withdrawing rate was large. Thus, it is understood that the Y value can be controlled only by the withdrawing rate without changing the physical property of the coating liquid. In Comparative Example 3, however, even in the case where the coating liquid for a charge generating layer containing the TiOPc having the crystal form of the invention, an interference fringe was generated when the Y value did not satisfy the specific value defined in the invention. Thus, it is understood that control of the Y value is particularly important in the coating liquid for a charge generating layer containing the TiOPc having the crystal form of the invention.

As described in the foregoing, the examples of the invention can provide the electrophotographic photoreceptors 10a and 10b that have high sensitivity to laser light and can form an image without generating an interference fringe due to interference of incident light and reflected light from the electroconductive support 1 of the laser light, and also can provide the coating liquid for a charge generating layer containing TiOPc for producing the same. In the electrophotographic photoreceptors 10a and 10b, an interference fringe due to interference of incident light and reflected light from the support 1 is not formed to obtain an excellent image, and the electric characteristics and the Y value can be easily controlled compared with the photoreceptors using the conventional TiOPc. Therefore, the photoreceptors 10a and 10b of the examples can be suitably used as photoreceptors of a laser printer and a digital duplicator using semiconductor laser light as a light source.

The method for manufacturing an electrophotographic photoreceptor using the coating liquid for a charge generating layer is also incorporated in the scope of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electrophotographic photoreceptor comprising:
an electroconductive support; and
a photosensitive layer on the electroconductive support, including at least a charge generating layer and a charge transporting layer accumulated thereon,
the charge generating layer containing oxotitanyl phthalocyanine as a charge generating material, wherein the oxotitanyl phthalocyanine has major diffraction peaks at Bragg angles (2θ±0.2°) of 7.3°, 9.4°, 9.6°, 11.6°, 13.3°, 17.9°, 24.1° and 27.2° in an X-ray diffraction spectrum,
the charge generating layer having a Y value of 37 or less, which Y value is one element of three excitation values in XYZ color system showing an object color.

2. The electrophotographic photoreceptor of claim 1, wherein the Y value of the charge generating layer is 35 or less.

3. The electrophotographic photoreceptor of claim 1, wherein in the X-ray diffraction spectrum of the oxotitanyl phthalocyanine, a bundle of peaks formed by the diffraction peaks at the Bragg angles (2θ±0.2°) of 9.4° and 9.6° which overlap each other, is a maximum intensity of diffraction, and the peak at the Bragg angle (2θ±0.20°) of 27.2° is a second maximum intensity of diffraction.

* * * * *